United States Patent

[11] 3,524,442

| [72] | Inventor | Thomas C. Horth |
| --- | --- | --- |
| | | Burlington, Massachusetts |
| [21] | Appl. No. | 687,379 |
| [22] | Filed | Dec. 1, 1967 |
| [45] | Patented | Aug. 18, 1970 |
| [73] | Assignee | Hewlett-Packard Company |
| | | Palo Alto, California |
| | | a Corp. of California |

[54] ARRHYTHMIA DETECTOR AND METHOD
11 Claims, 5 Drawing Figs.

| [52] | U.S. Cl. | 128/2.06 |
| --- | --- | --- |
| [51] | Int. Cl. | A61b 5/04 |
| [50] | Field of Search | 128/2.06, 2.05 |

[56] References Cited
UNITED STATES PATENTS

| 3,215,136 | 11/1965 | Holter et al. | 128/2.06 |
| --- | --- | --- | --- |
| 3,267,934 | 8/1966 | Thornton | 128/2.06 |
| 3,318,303 | 5/1967 | Hammacher | 128/2.05 |
| 3,352,300 | 11/1967 | Rose | 128/2.06 |

Primary Examiner—William E. Kamm
Attorney—A. C. Smith

ABSTRACT: A system operates to threshold detect electrocardiographic (ECG) signals received from a patient to determine the presence of QRS wave portions. The widths of the QRS waves are measured by digital techniques. During a first operating period, a QRS width is stored in memory as a "normal" for the patient, and during a subsequent operating period, the patient's QRS waves are compared with the stored "normal". Additional digital circuitry detects when QRS waves are premature by a predetermined amount. The recurrence of abnormally wide or premature QRS waves causes the activation of alarms and control signals. Rejection circuitry operates to distinguish the QRS waves from T waves which follow wide beats and also from spurious noise signals.

Patented Aug. 18, 1970

INVENTOR
THOMAS C. HORTH

BY A. C. Smith

ATTORNEY

Patented Aug. 18, 1970

INVENTOR
THOMAS C. HORTH

BY  A. C. Smith

ATTORNEY

Patented Aug. 18, 1970

INVENTOR
THOMAS C. HORTH

BY Q. C. Smith

ATTORNEY

ARRHYTHMIA DETECTOR AND METHOD

BACKGROUND OF THE INVENTION

Recent reports indicate that the mortality rate due to myocardial infarction peaks at the onset of a heart attack and recedes almost exponentially with time, with about 65% of deaths occurring in the first three days and about 85% of deaths occurring in the first week after attack. Ventricular fibrillation and other serious departures from normal heart activity following infarction is almost always preceded by abnormally wide beats, commonly referred to as premature ventricular contractions (PVC). The increasing rate of occurrence of PVC's is an important indication of the onset of serious arrhythmias such as ventricular tachycardia, flutter and fibrillation. However, the onset of such arrhythmias may be prevented if drugs are administered early enough to regulate the heart activity.

SUMMARY OF THE INVENTION

Accordingly, the arrhythmia detector circuit of the present invention responds to selected types of abnormal beats to provide indications of the serious nature of a patient's heart activity in time to permit corrective drugs to be administered to the patient to restore his normal heart activity. The present detector circuitry is first operated in a storage mode to store information such as amplitude or width of selected wave portions of electrocardiographic (ECG) signals during a selected period of normal heart activity of a patient. Following this, the circuit operates to compare the ECG signals subsequently received from the patient with the signal information previously stored for producing alarm outputs in response to variations in the compared signals exceeding preselected limits.

DESCRIPTION OF THE PREFERRED EMBODIMENT

Figure 1:
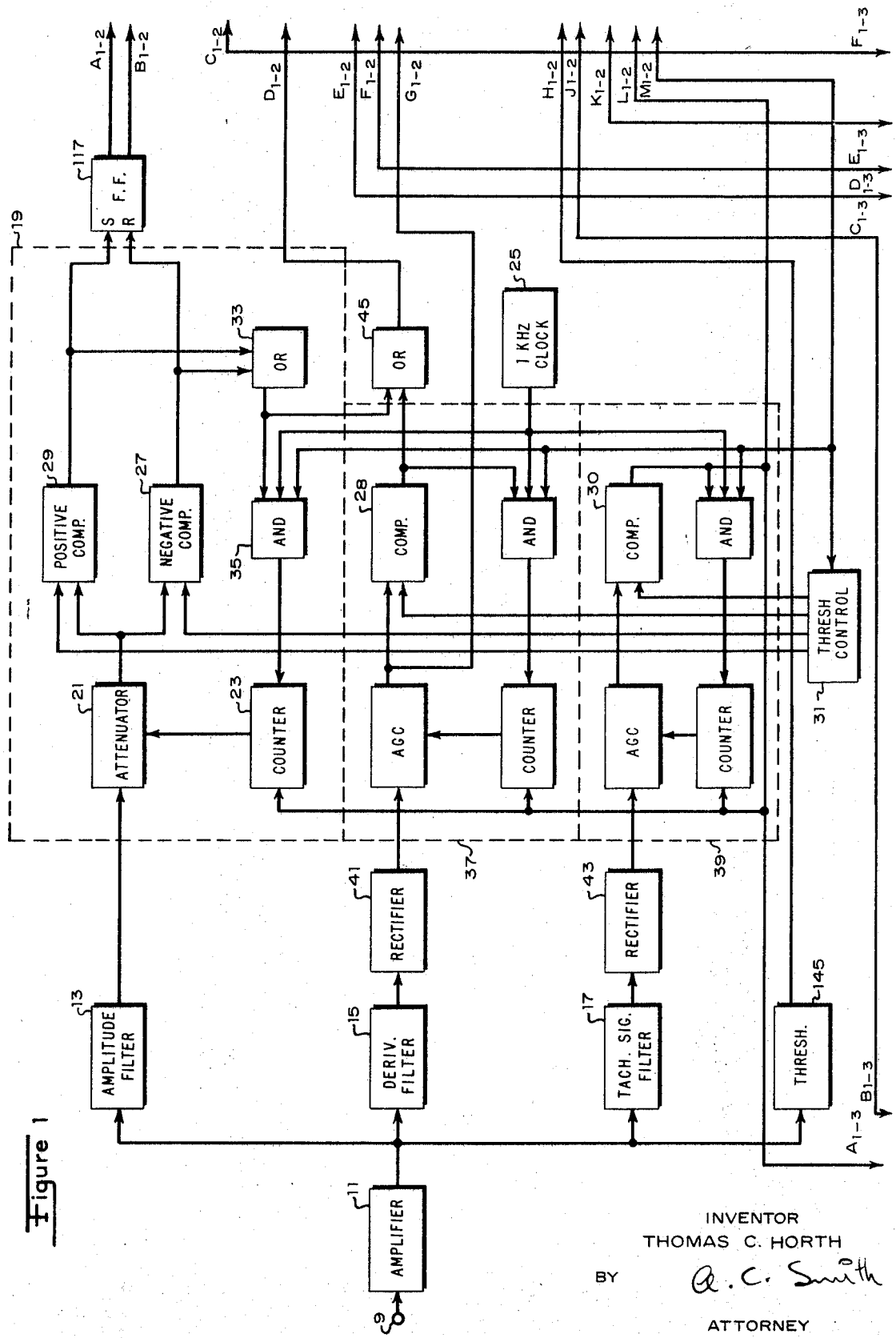
FIGURES 1-4 are sections of a schematic diagram of the arrhythmia detector circuit of the present invention.
Figure 2:
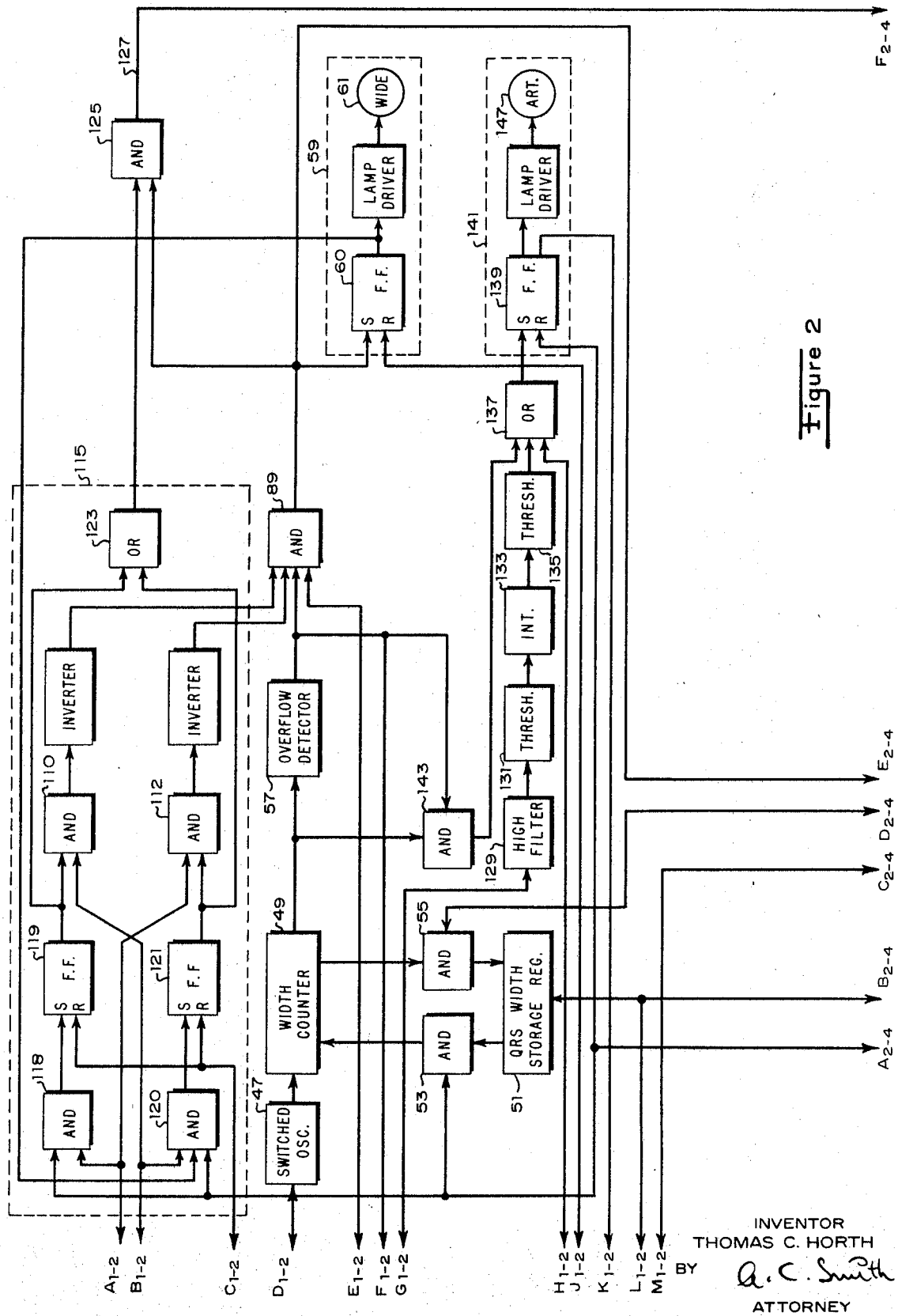

Referring now to FIGURES 1 through 5 there is shown an input terminal 9 which receives electrocardiographic (ECG) signals from a patient. Buffer amplifier 11 connected to the input terminal 9 eliminates loading of received ECG signals and its output is applied to three bandpass filters 13, 15 and 17. The amplitude filter 13 passes approximately 1 to 10 hertz, the derivative filter 15 peaks at approximately 25 hertz and the tachometer signal filter 17 peaks at approximately 10 hertz. The output of the amplitude filter is then applied to a digitally-controlled automatic gain control circuit (AGC) 19 which includes a signal-controlled attenuator 21 that is controlled by the output of counter 23. This counter includes four binary stages which count pulses from oscillator 25 during a Sequence B pulse, later described in connection with the storing cycle of operation shown graphically in FIGURE 5, to provide 16 different attenuation settings of the attenuator 21. The negative and positive comparators 27, 29 and the associated logic gates 33, 35 operate on the output of the threshold control 31 and on the output of attenuator 21 to disable the counter 23 and, hence, adjust attenuator 21 to a setting which attenuates the highest peak ECG signal appearing during the Sequence B pulse to approximately the value of threshold signal, say, one volt applied to the comparators 27, 29 by the threshold control 31. At the end of a Sequence B pulse, the counter 23 is disconnected from the oscillator 25 by gate 35 and the threshold control 31 lowers the threshold signal by approximately 25% to, say, .75 volts. Thus, after the end of a Sequence B pulse, the comparators 27, 29 produce outputs each time the ECG signal exceeds this decreased value of threshold signal.

The signals from derivative filter 15 and from tachometer signal filter 17 are similarly treated in automatic gain control (AGC) circuits 37 and 39, except that full-wave rectifiers 41 and 43 precede the gain control circuits 37 and 39. Thus, since signal of only one polarity is present, only one comparator 28, 30 is required in each of the AGC circuits 37 and 39.

STORAGE CYCLE

ECG signals received from a patient are similar to the waveform shown in FIGURE 5d during normal heart activity. The QRS portion of each pulse received from a patient is compared in height and width with the values previously stored during the storage cycle of operation. Each such beat which differs from the stored values by more than a preset tolerance is considered ventricular. The timing of such beats is checked to see if it is premature relative to the rhythm established by the last few previous beats. Thus if a beat is both premature and ventricular, it is considered a premature ventricular contraction (PVC) and a trend of increasing recurrence of such beats triggers an alarm. Thus, in order to adjust the circuit for proper operation on the particular ECG signals received from a patient and to store information about the amplitude and width of a normal QRS pulse for use as a reference for comparison therewith of subsequent QRS pulses received from the same patient, the arrhythmia detector circuit of the present invention is first operated in its storage cycle mode of operation. When the storage cycle button 10 (FIG. 4) is depressed and released, a Sequence A pulse is generated by generator 12, as shown in FIGURES 5a and b. This pulse performs the following functions: (1) turns on or sets the Sequence C flip-flop 14 which then produces the Sequence C pulse of FIGURE 5h that remains present for the entire storage cycle; (2) triggers the oscillator 16 (FIG. 3) which produces outputs spaced a selected time interval apart, say 2.8 seconds; (3) resets the 6-stage binary counter 18 to zero; (4) resets the PVC storage register 22 to zero; (5) resets all the AGC circuits 19, 37 and 39 for minimum signal attenuation; and (6) sets the QRS width storage register 51 (FIG. 2) to two rather than zero for reasons described later. The Sequence C pulse at the output of flip-flop 14 (FIG. 4) also performs several functions as follows: (1) actuates the indicator lamp 24 (FIG. 3) through gate 26 and flip-flop 28; (2) resets the PVC counter 20 to zero; (3) controls the operation of a remote electrocardiograph recorder 153 (FIG. 4) connected to output terminal 30 through OR gate 32 and relay driver 34 so that a graphic record may be produced of the QRS pulses that provide the reference values stored by the circuit; and (4) combines in AND gate 36 with the EVEN output of counter 18 (FIG. 3) and the output of width storage flip-flop 38 (FIG. 4) to produce the Sequence B pulse, as shown in FIGURE 5c. Sequence C pulse is also combined in AND gate 40 with the ODD output of counter 18 (FIG. 3) and the Set 2 pulse produced by the tachometer circuitry to set the width storage flip-flop 38 (FIG. 4) at the end of the Sequence B pulse. The signal from the width storage flip-flop 38 is combined in AND gate 44 with the Readout pulse, as shown in FIGURE 5f, produced by the tachometer circuitry to produce the Sequence D pulse shown in FIGURE 5i. This occurs after the second QRS pulse following the end of the Sequence B pulse. This Sequence D pulse causes the count in counter 49 (FIG. 2) related to the reference QRS pulse width to be transferred into storage in register 51 through the AND gate 55 and also resets the Sequence C flip-flop 14 (FIG. 4). The reset output of flip-flop 14 then combines in AND gate 42 with the Reset 2 pulse to reset the width storage flip-flop 38 and thereby end the storage cycle.

QRS WIDTH DETERMINATION

The width of the QRS portion of the ECG signal is measured as the time during which any derivative or amplitude threshold value in AGC circuits 19 and 37 (FIG. 1) is exceeded. Thus, OR gate 45 is connected to receive the outputs of the comparators in these AGC circuits to provide a logic signal which indicates that a threshold value is exceeded. This logic signal turns on an oscillator 47 (FIG. 2) which generates a pulse at selected intervals, say every 15 milli-seconds. Thus, if threshold values are exceeded for less than 15 milliseconds, no pulse is generated. Pulses from oscillator 47 are counted in a 5-stage binary counter 49 for comparison with the count which was previously stored in the QRS width storage register 51 during the storage cycle of operation. Thus, referring to the operation of this portion of the present circuitry during the storage cycle, the QRS width storage register 51 is set to an initial value of two (rather than zero) by the Sequence A pulse, as shown in FIGURE 5b. A train of clock pulses is generated by tachometer circuitry, later described, after each QRS pulse is detected following the Sequence A pulse. The last of these clock pulses is identified as the Reset 2 pulse which transfers the count in the register 51 to the counter 49. This Reset 2 pulse appears just after the first QRS pulse that appears following a Sequence B pulse (FIGURE 5c) in the storage cycle and causes the initially-set value of two in the register 51 to be transferred through AND gate 53 to the counter 49. The QRS pulse which is second to appear after the Sequence B pulse is measured by counting pulses from oscillator 47 and the total count of pulses is the QRS width plus two counts. This count provides reference width with a 30 millisecond tolerance (represented by the two extra counts) included. After this second-appearing QRS pulse, the complement of the reference-width count in the counter 49 is transferred through AND gate 55 to the storage register by a Sequence D pulse (FIGURE 5i) which occurs just prior to the next Reset 2 pulse (FIGURE 5g). The complement of the reference width count thus stored in the register 51 is transferred back to the counter 49 on each succeeding Reset 2 pulse applied to gate 53. Since adding a complement in binary arithmetic is equivalent to subtracting, the subsequent count by counter 49 so conditioned of pulses from oscillator 47 during a QRS pulse thus provides a comparison of the QRS pulse width with the reference width and any overflow from the counter 49 thus indicates that the measured width exceeded the reference width. Overflow signals from counter 49 are detected by detector 57 and are verified in a manner later described to rule out the presence of any artifacts or errors, and are then applied to indicator circuitry 59 including a panel lamp 61 to indicate the occurrence of a wide beat.

The output of the AGC circuit 39 which follows the tachometer signal filter 17 sets the Flash flip-flop 63 at each occurrence of a QRS beat. This sets a timer 65 which then automatically resets the Flash flip-flop 63 after a selected deadtime, say 240 milliseconds, during which flip-flop 63 cannot be retriggered by another QRS beat. This dead-time thus also limits the circuit to operation on heartbeats occurring at rates lower than 250 beats per minute. The output of flip-flop 63 provides the QRS pulses of FIGURE 5e which operate the indicator lamp 24 and which reset the wide beat flip-flop of indicator circuit 59 (FIG. 2) and the early beat flip-flop 67 (FIG. 3) to turn off the associated indicator lamps before the next beat is analyzed. Also, the trailing edges of the QRS Flash pulses of FIGURE 5e trigger the chain of pulse generators 69, 71 and 73 which generate the Readout pulses of FIGURE 5f at the output of generator 69, the Reset 1 pulses at the output of generator 71, and the Reset 2 pulses of FIGURE 5g at the output of generator 73. The output pulses from the QRS Flash flip-flop 63 which are about 240 milliseconds in length are applied to the tachometer circuit 75, typically a critically-damped, low-pass filter, to produce an output voltage which is proportional to the heartbeat rate. This rate voltage is applied to the voltage-controlled oscillator 77 to control the frequency of pulses produced thereby at about 2½ times the heart rate. The voltage-controlled oscillator 77 is reset by each Reset 1 pulse and is started in synchronism with the QRS beats. The pulses are applied to counter 79 which is reset to zero by each Reset 2 pulse.

If the heartbeat of the patient is regular, counter 79 advances to 1 when 40% of the QRS-to-QRS interval passes and to 2 when 80% of the interval passes due to the 2½ times faster rate of pulses from oscillator 77. If the next QRS pulse does not occur at the next regular instant, the counter 79 advances to 3 at 120% of the expected interval. It will then lock on that count until reset by the next Reset 2 pulse. Thus, a count of 0 to 1 at Readout pulse time (just before Reset 2) indicates that the QRS pulse was at least 20% premature and a count of 2 indicates that the QRS pulse was within ± 20% of the expected time, while a count of 3 indicates that the QRS pulse was at least 20% late.

The gating circuit 81 determines the state of the counter 79 at Readout time for several purposes. If the QRS pulse is early (count = 0 or 1), the Early flip-flop 67 is set by the gating circuit 81 and this activates the Early indicator lamp 83, which remains on until the next QRS Flash pulse. The output of gating circuit 81 is combined in gate 85 with the output of wide-beat detector 57 (FIG. 2) to provide a signal which indicates that the QRS pulse occurred when expected (count = 2) and was not wide and, hence, indicates that the beat was normal in all respects. This signal thus resets the PVC Run Counter 20 (FIG. 3) to zero through the OR gate 87. The output of gating circuit 81 which indicates that the QRS pulse was not late (count = 0, 1, or 2) is thus applied to gate 89 (FIG. 2) to establish an indication that a beat is wide. The reason for this is that beats detected as late are most likely the result of the tachometer comparator in AGC circuit 39 failing to trigger on the previous beat due to some artifact. In such cases, the beat is frequently erroneously measured to be wide since the width of the missed beat will be added to that of the detected beat. Hence, late, wide beats are ignored.

PVC TREND INDICATION

Figure 3:
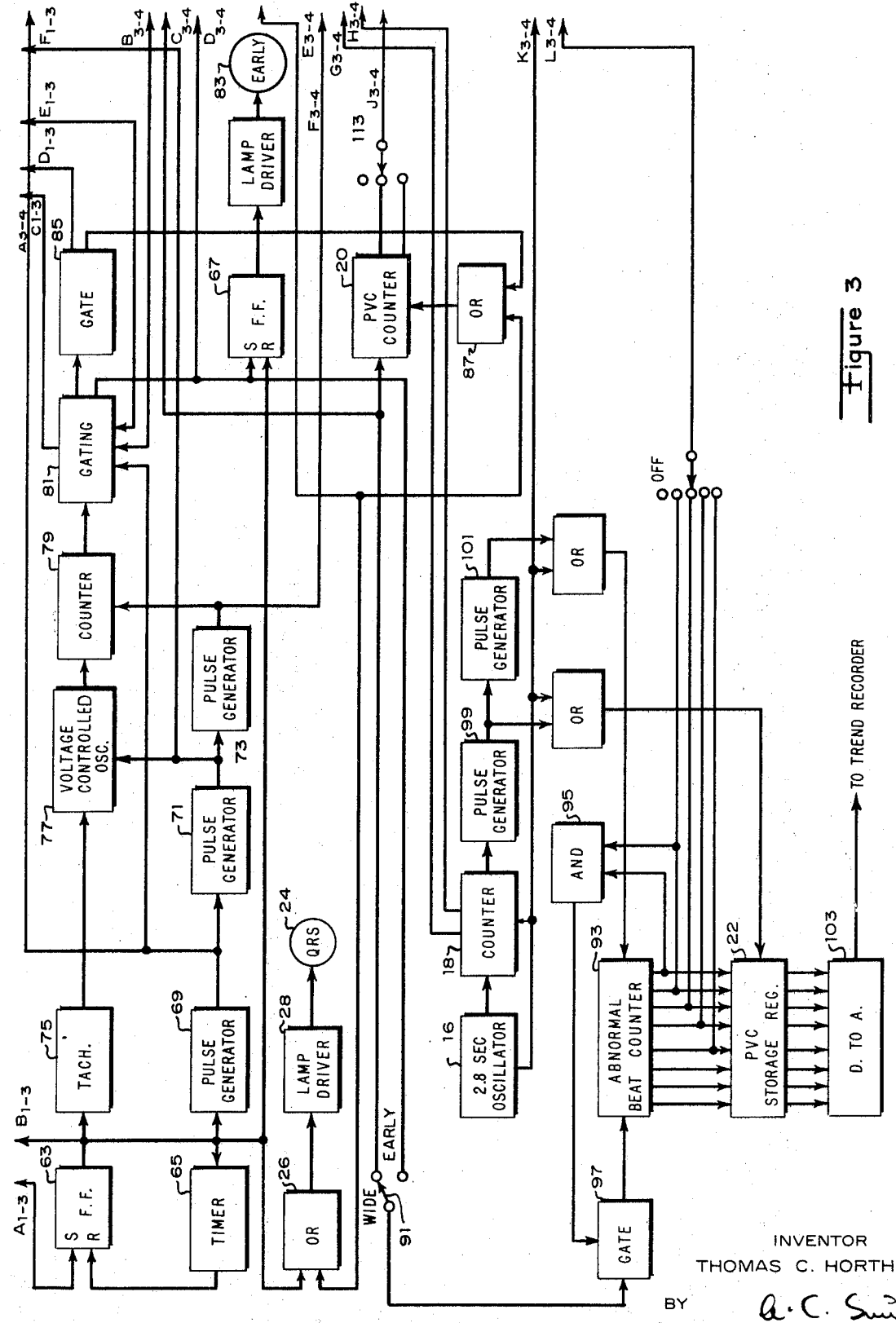
Figure 4:
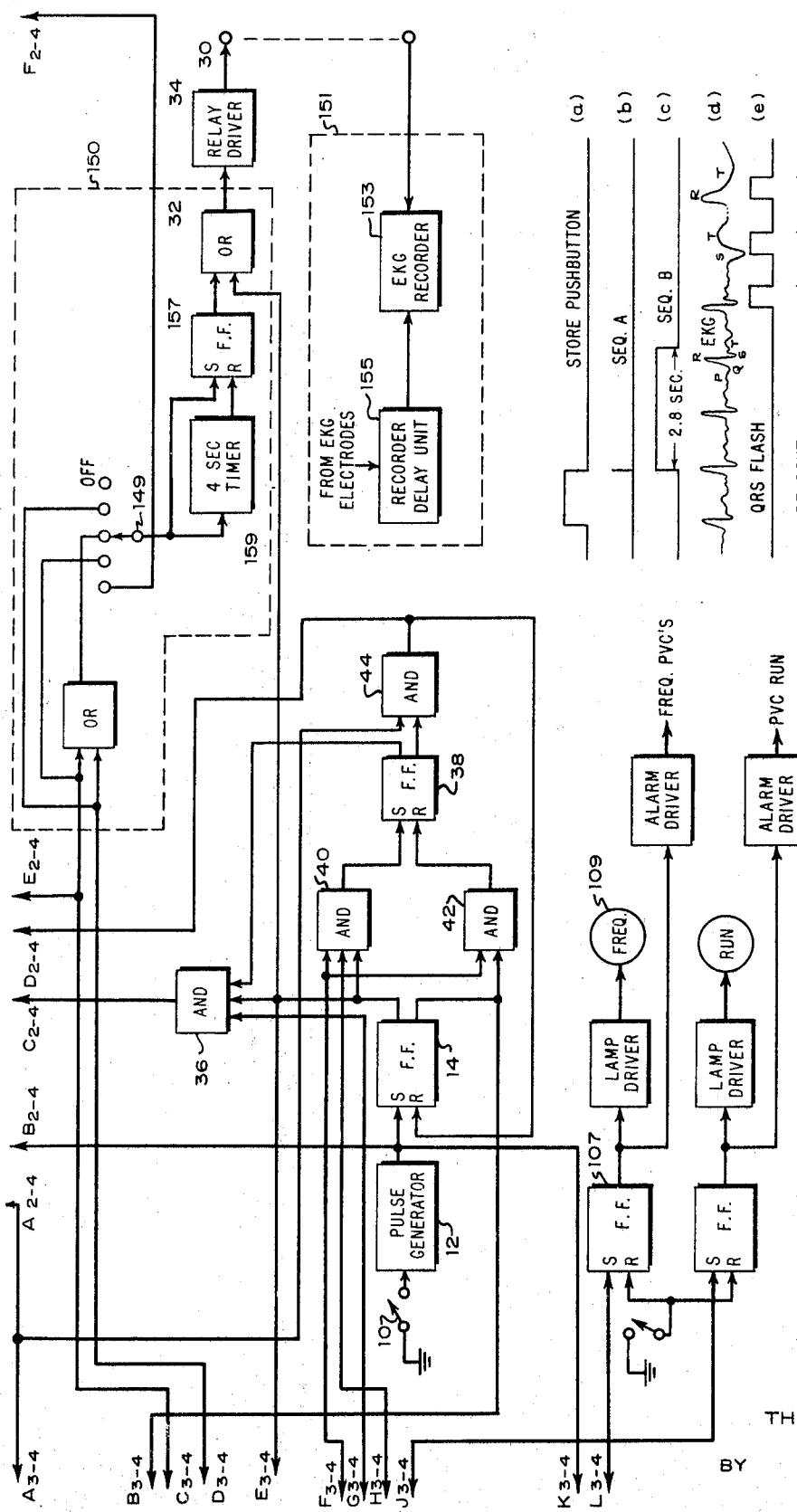
Figure 5:
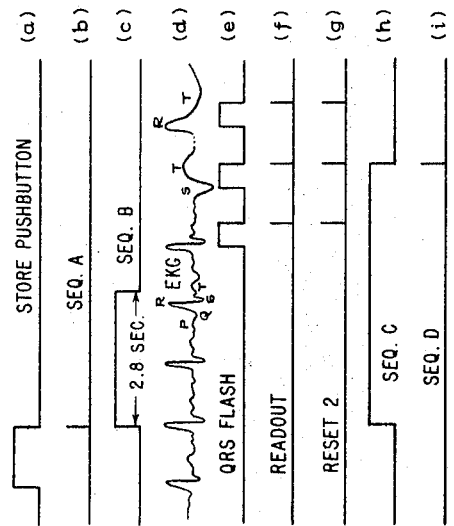
FIGURE 5 is a graph showing the sequence of signals appearing at a selected points in the circuit of FIGURES 1-4.

The operator may elect to record the long-term trend in the frequency of recurrence of either wide beats or early beats by means of switch 91 (FIG. 3). Whichever beats are selected are counted in an 8-stage Abnormal Beat counter 93 which has outputs that are weighted 1, 2, 3, 6, 12, 24, 48 and 96. When the counter reaches a count of 144 (two most significant bits = true, as determined by AND gate 95), the counter 93 is gated off by gate 97. Each 3 minutes, as determined by 2.8-second oscillator 16 and the count-to-64 binary counter 18, the contents of the Abnormal Beat counter 93 are transferred in parallel into an 8-bit Storage Register 22 and immediately thereafter the counter 93 is reset to zero by the 3-minute reset pulse from the cascaded generators 99 and 101 so that the counter 93 can accumulate abnormal beats in the next 3 minutes.

The outputs of the Storage Register 22 may be applied to a D-to-A converter 103, weighted as above, to provide an Abnormal Beats/Minute voltage for a trend recorder or other display. The voltage represents the abnormal beats counted in the previous 3-minute period on a selected scale, say, 100 mv./beat/minute.

ALARM CIRCUITS

The 4th, 5th, 6th, and 7th stages of the Abnormal Beat counter 93 represent 6, 12, 24 and 48 beats, or 2, 4, 8 and 16 beats/minute. These signals go to the Abnormal Beat Alarm switch 105 (FIG. 3) which allows an operator to select the alarm limit. The selected limit, if it occurs, sets flip-flop 107 (FIG. 4) which, in turn, activates the Frequent Abnormal Beat Alarm lamp 109 and activates the corresponding alarm line. The lamp 109 and alarm remain in the activated state until the operator resets the flip-flop 107 by pressing the Reset button 111 connected thereto.

The wide beats are counted by the 4-stage PVC Run counter 20 (FIG. 3), which has outputs weighted 1, 2, 3, 6. This counter is reset to zero by the Sequence C during the storing cycle so that the counter 20 starts correctly, and is also reset any time a "completely normal" beat signal from gate 85 is detected. Thus, counter 20 determines the number of wide beats in a run without intervening normal beats. Signals from the 3rd and 4th stages, representing 3 and 6 beats in a run, go to PVC Run Alarm switch 113 which allows the operator to select the alarm limit. The Run Alarm circuitry and lamp 160 (FIG. 4) operate similarly to the Frequent Abnormal Beat alarm discussed above.

T-WAVE REJECTION CIRCUITRY

Large ventricular beats are likely to be followed by very large, long T-waves as shown at the right-hand end of FIG. 5d. The T-waves are sometimes detected as separate beats and and are likely to be measured as being wide. Hence, in order to prevent ventricular beats from being counted twice, the T-waves detector circuitry 115 (FIG. 2) is provided to detect T-waves following wide beats. A characteristic of T-waves following ventricular beats is that they are almost always of opposite polarity from the last major portion of the QRS pulse. This fact can be used advantageously to separate T-waves from the more serious case of two successive ventricular beats. The polarity flip-flop 117 (FIG. 1) operates from the two amplitude comparators 27 and 29 to keep track of the polarity of the most recent large signal. When a wide beat is detected, one of two output lines of the flip-flop 117 is set and represents "last beat wide and positive" or "last beat wide and negative." If the next beat is of the opposite polarity, the wide decision is inhibited by the AND gates 110, 112 (FIG. 2) and the inverters 114, 116, the outputs of which which are then applied to inputs of AND gate 89 connected to drive the wide beat flip-flop 60. The T-wave detector circuitry is also used to detect two successive wide beats of the same polarity. Each of the flip-flops 119 and 121 receives an output from an AND gate 118, 120 which, in turn, receives outputs from an AND gate polarity flip-flop 117 and an output from wide beat flip-flop 60 so that the operating states of the flip-flops 119 and 121 indicate that the last beat was wide. Thus, if either of these flip-flops 119 and 121 is on (thereby providing an output from OR gate 123 connected to flip-flops 119 and 121) and another wide beat is detected (thereby providing an output from AND gate 89), then the signals from AND gate 89 and from OR gate 123 may be combined in AND gate 125 to provide a signal on line 127 which indicates that two successive wide beats have occurred. This signal may be used to operate an electrocardiograph recorder, as described later.

SPURIOUS SIGNAL REJECTION CIRCUITRY

The present circuitry includes means for detecting and rejecting spurious signals due, for example, to power line interference, electromyographic noise, DC signals from the electrodes, and the like. High frequency spurious signals are received from the derivative filter 15 (FIG. 1) and following circuitry and are passed through a high-frequency filter 129 (FIG. 2) to select out the spurious signals from the QRS beat. If the amplitude of the high-frequency signal at the output of the filter 129 is sufficiently large to cause problems, the threshold detector 131 following the filter 129 passes the spurious signal to an integrator 133. Thus, if the duration of the spurious signal is sufficiently long as well, the threshold circuit 135 following the integrator passes the integrator signal through OR gate 137 to trigger the artifact flip-flop 139 in the alarm circuit 141. The flip-flop 139 may also be triggered by the appearance of a QRS beat which is so wide that it could not possibly be a real beat. The AND gate 143 is connected to receive the overflow output from the counter 49 and the output from the overflow detector 57 connected to the counter 49 to produce an output which triggers flip-flop 139 through OR gate 137 in response to the measured width of a beat exceeding the stored reference width by at least 240 milliseconds. Further, the flip-flop 139 may also be triggered by undesirably large DC levels present at the input terminal 9 (FIG. 1). DC levels due to electrode problems, and the like, which exceed a threshold value determined by threshold circuit 145 are also applied to OR gate 137 (FIG. 2) to trigger the flip-flop 139. Whenever any of the described spurious signals appear with sufficient magnitude and duration to trigger the flip-flop 139, it remains set and maintains the artifact alarm lamp 147 illuminated until the next Reset 2 pulse from generator 73 (FIG. 3) is applied to the reset input of flip-flop 139 (FIG. 4), thereby preventing the beat from being categorized as early or wide.

An output selector circuit 150 includes a switch 149 for manually selecting the readout either of EARLY, WIDE, EITHER (early or wide) or SEQUENCE OF WIDE beats that may appear at the input 9. Thus, abnormal beats of selected type may be graphically recorded by remote recording circuitry 151 which includes an ECG signal recorder 153 connected to be remotely controlled by the present arrythmia detector circuitry and a tape-loop type signal delay unit 155 which applies to the recorder 153 the same signals from the ECG signal electrodes positioned on a patient as are applied to input 9. A tape-loop signal delay unit suitable for use as unit 155 is a Model 780-5A instrument manufactured by the Sanborn Division, Hewlett-Packard Company, Waltham, Massachusetts.

If switch 149 is set in the OFF position, the remote recorder 153 will only run to record heartbeats occurring during the storing cycle in response to the Sequence C pulse applied to OR gate 32. If switch 149 is set in the EARLY position, any beat detected as early will cause the recorder 153 to run in a response to signal from gating circuit 81 (FIG. 3) applied through the switch 149 (FIG. 4) and flip-flop 157 to OR gate 32. The flip-flop 157 is reset after about 4 seconds in response to the timer 159 connected to the reset input. Thus, because of the delay provided by unit 155, the abnormal beat of selected type will appear near the end of the 4-second recorder-run period preceded by two or more normal beats that are useful for evaluating heart rhythm.

If switch 149 is set in the WIDE position, the remote recorder 153 operates as described above in connection with the EARLY setting of switch 149, but only after a wide beat is detected. Also, if switch 149 is set to the EITHER position, the remote recorder 153 operates as described above after a wide or early beat is detected. In either of these cases, however, if a second abnormal beat occurs while the recorder 153 is running, the flip-flop 157 remains in set position and, hence, recorder 153 continues to run for another 4-second recorder-run period. If switch 149 is set in the SEQUENCE OF WIDE position, the output select circuit 150 will operate the remote recorder 153 in response to signals on line 127 appearing only on two or more successive wide beats. This is a particularly useful output mode to use with patients having a large number of randomly-occurring wide beats where, nevertheless, two such beats in succession may be considered extremely serious.

I claim:

1. Signal apparatus for monitoring electrocardiographic (ECG) signals produced by a patient and normally including P, Q, R, S and T wave portions, said apparatus comprising:

signal-selecting means responsive to said ECG signals for producing a first output in response to a selected electrical parameter of said ECG signal attaining a predetermined value to thereby indicate the presence of a QRS portion of said ECG signal;

circuit means operatively coupled to said signal-selecting means and responsive to said first output for producing a second output representative of the time during which the first output is present to thereby indicate the width of said QRS portion, said circuit means being operative to produce said second output during a first operating period and also during a subsequent operating period;

storage means operatively coupled to said circuit means for storing the second output corresponding to the width of a QRS portion occurring during the first operating period; and output means operatively coupled to said circuit means and to said storage means for comparing the stored second output representing the width of a QRS portion occurring during said first operating period with the second outputs representing the widths of QRS portions occurring during said subsequent operating period, said output means being operative to produce an output indication of an abnormally wide QRS portion when a second output during said subsequent operating period attains a predetermined relationship to the stored second output.

2. Signal apparatus as in claim 1, wherein said signal-selecting means includes means for attenuating said ECG signals to preselected amplitudes and for producing said first output in response to the QRS portion of the attenuated ECG signals exceeding a predetermined threshold.

3. Signal apparatus as in claim 1 comprising:
means responsive to a selected plural number of occurrences of said output indications during the subsequent operating period for producing an output signal indicative of the occurrence of a plurality of abnormal QRS portions of received ECG signals.

4. Signal apparatus as in claim 3 comprising:
means responsive to a plural number of occurrences of abnormal QRS portions for producing an output signal related to the frequency of abnormal QRS portions; and
means responsive to a plural number of occurrences of abnormal QRS portions for producing an output signal related to the number of sequential abnormal QRS portions.

5. Signal apparatus as in claim 1 wherein said circuit means includes an oscillator for producing pulses at preselected intervals in response to the application of said first output thereto, and includes an accumulator connected to receive said pulses for producing said second output indicative of the time said first output is applied to said oscillator.

6. Signal apparatus as in claim 5 wherein said accumulator is a counter adapted to count pulses from said oscillator and said storage means includes a storage register which is operative during a first operating period to store the count of pulses by said counter during said first operating period.

7. Signal apparatus as in claim 6 wherein said output means comparing second outputs includes gating means for transferring into said counter the complement of the count of pulses stored in said storage register to preset the said counter to the complement of said count of pulses; and means coupled to said counter for producing an overflow signal in response to the number of pulses applied to said counter during said subsequent operating period exceeding the stored count of pulses during the first operating period.

8. Signal apparatus as in claim 1 wherein:
said signal-selecting means includes a variable attenuator and means to adjust the variable attenuator during said first operating period in response to the amplitude of the largest ECG signal applied to the signal-selecting means during said first operating period.

9. Signal apparatus as in claim 1 wherein said signal-selecting means includes:
a first signal filter having a band pass frequency characteristic between approximately 1 and 10 hertz and a second signal filter having a band pass frequency characteristic centered at approximately 25 hertz; and includes for each signal filter a variable attenuator and means to adjust each variable attenuator in response to the amplitude of the largest signal passed by the corresponding signal filter during said first operating period; and
means coupled to the output of each of said variable attenuators for producing said first output in response to signals passed by either of said variable attenuators during said subsequent operating period.

10. Signal apparatus as in claim 1 wherein:
said signal-selecting means includes means for detecting the polarity of the portion of an ECG signal which attains said predetermined value; and
means responsive to said polarity detecting means and said output means for comparing the polarities of two successive abnormally wide ECG signal portions which produce said output indications and for producing an output signal only when said two successive ECG signal portions have the same polarity.

11. The method of analyzing electrocardiographic signals from a patient and normally including P, Q, R, S and T wave portions comprising the steps of:
normalizing to a first predetermined value a selected parameter of the QRS portion of ECG signals received during a first operating period;
generating constant frequency pulses;
digitally counting said constant frequency pulses for measuring the time during which the selected parameter of the normalized ECG signal attains a second predetermined value during the first operating period;
storing said digital count of pulses;
digitally counting said constant frequency pulses for measuring the time during which the selected parameter of the normalized ECG signals produced during a subsequent operating period attains said second predetermined value; and
comparing the digital counts obtained during said first and subsequent operating periods to produce an output indication in response to said digital counts attaining a preselected relationship.

UNITED STATES PATENT OFFICE
CERTIFICATE OF CORRECTION

Patent No. 3,524,442          Dated August 18, 1970

Inventor(s) Thomas C. Horth

It is certified that error appears in the above-identified patent and that said Letters Patent are hereby corrected as shown below:

Column 5, lines 31-32, cancel "an AND gate".

SIGNED AND
SEALED
OCT 27 1970

(SEAL)
Attest:

Edward M. Fletcher, Jr.
Attesting Officer

WILLIAM E. SCHUYLER, JR.
Commissioner of Patents